US012006173B2

(12) United States Patent
Naitou

(10) Patent No.: US 12,006,173 B2
(45) Date of Patent: Jun. 11, 2024

(54) CASSETTE DRAWING-IN DEVICE AND SHEET SUPPLY DEVICE

(71) Applicant: TOSHIBA TEC KABUSHIKI KAISHA, Tokyo (JP)

(72) Inventor: Tomoki Naitou, Chiba Chiba (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 151 days.

(21) Appl. No.: 17/901,915

(22) Filed: Sep. 2, 2022

(65) Prior Publication Data

US 2024/0076148 A1 Mar. 7, 2024

(51) Int. Cl.

*B65H 1/26* (2006.01)
*B65H 1/04* (2006.01)
*G03G 15/00* (2006.01)

(52) U.S. Cl.

CPC ............... *B65H 1/266* (2013.01); *B65H 1/04* (2013.01); *G03G 15/6502* (2013.01); *B65H 2402/60* (2013.01); *B65H 2405/112* (2013.01); *B65H 2405/121* (2013.01); *B65H 2801/06* (2013.01)

(58) Field of Classification Search

CPC .... B65H 1/266; B65H 1/04; B65H 2405/112; B65H 2405/31; B65H 2402/60; G03G 15/6502

See application file for complete search history.

(56) References Cited

U.S. PATENT DOCUMENTS

2021/0253380 A1* 8/2021 Oshida .................. B65H 1/266

FOREIGN PATENT DOCUMENTS

| | | |
|---|---|---|
| JP | 2008-254841 | 10/2008 |
| JP | 2011-020789 | 2/2011 |
| JP | 2013-256355 | 12/2013 |
| JP | 2014-156352 | 8/2014 |
| JP | 2017-124909 | 7/2017 |
| JP | 2019-189377 | 10/2019 |

* cited by examiner

*Primary Examiner* — Luis A Gonzalez
(74) *Attorney, Agent, or Firm* — Amin, Turocy & Watson, LLP

(57) ABSTRACT

A cassette drawing-in device in an embodiment includes a lever, a guide section, and an urging member. The lever includes an engaging groove opened on a first side in a first direction. The engaging groove includes an entrance for a cassette pin at an end portion in a longitudinal direction. The cassette pin projects to a second side in the first direction from a cassette. The cassette is capable of moving in a second direction orthogonal to the first direction. The lever rotates around the rotation axis to thereby draw in, in the second direction, the cassette pin engaging in the engaging groove. The guide section is formed in the entrance of the engaging groove and guides the cassette pin to the first side in the first direction. The urging member urges the lever to the first side in the first direction.

19 Claims, 8 Drawing Sheets

CASSETTE DRAWING-IN DEVICE AND SHEET SUPPLY DEVICE

FIELD

Embodiments described herein relate generally to a cassette drawing-in device and a sheet supply device.

BACKGROUND

An image forming apparatus disposed in a workplace forms an image on a sheet. The image forming apparatus includes a sheet supply device that supplies the sheet. The sheet supply device includes a cassette, a housing, and a cassette drawing-in device. The cassette is capable of storing sheets. The cassette drawing-in device draws the cassette into the housing. There has been a demand for a cassette drawing-in device and a sheet supply device that can improve reliability of an operation.

DETAILED DESCRIPTION

A cassette drawing-in device in an embodiment includes a lever, a guide section, and an urging member. The lever is capable of rotating around a rotation axis parallel to a first direction. The lever includes an engaging groove opened on a first side in the first direction. The engaging groove includes an entrance for a cassette pin at an end portion in a longitudinal direction. The cassette pin projects to a second side, which is an opposite side of the first side, in the first direction from a cassette. The cassette is capable of moving in a second direction orthogonal to the first direction. The lever rotates around the rotation axis to thereby draw in, in the second direction, the cassette pin engaging in the engaging groove. The guide section is formed in the entrance of the engaging groove and guides the cassette pin to the first side in the first direction. The urging member urges the lever to the first side in the first direction.

The cassette drawing-in device and the sheet supply device in the embodiment are explained below with reference to the drawings.

Figure 1:
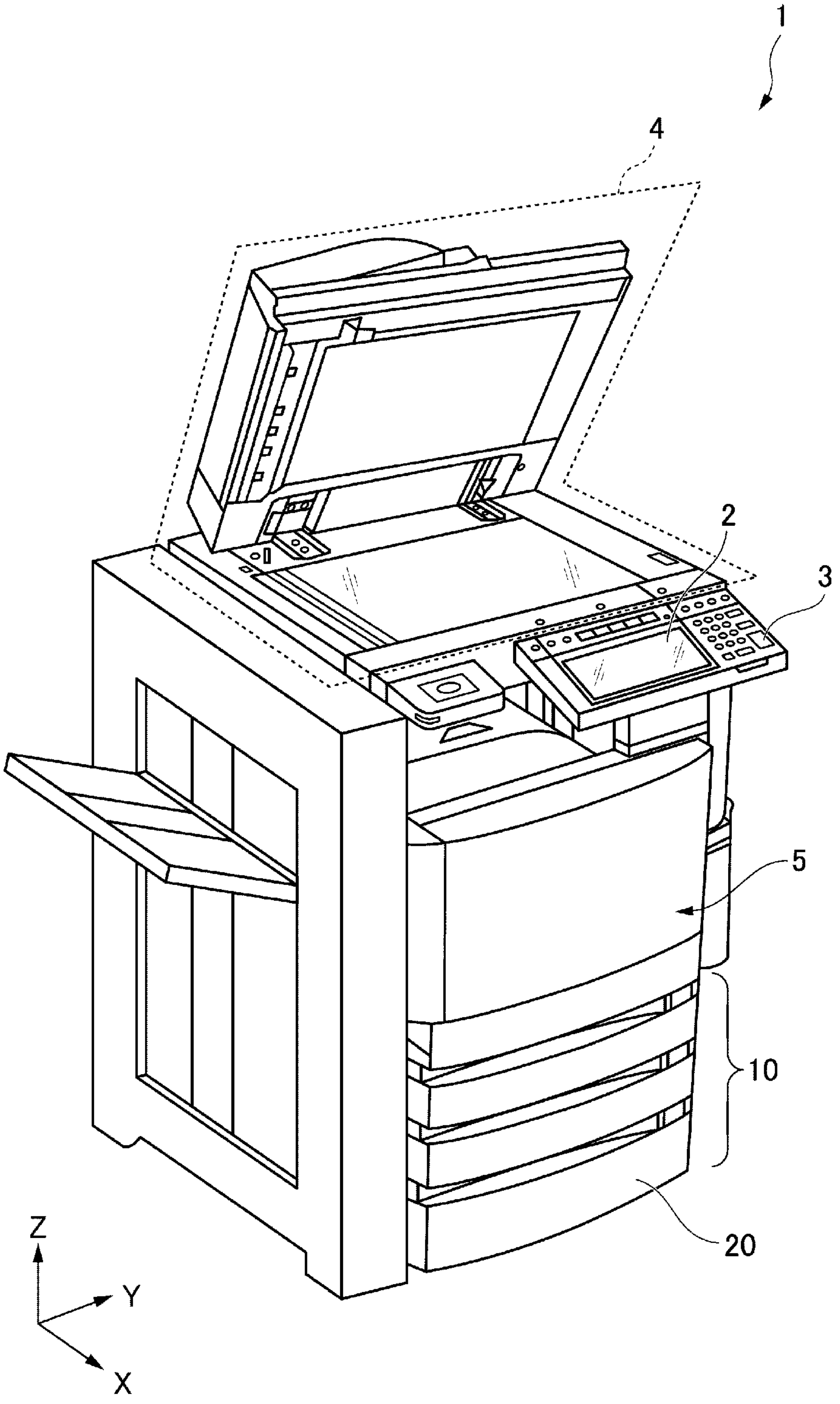
FIG. 1 is a perspective view of an image forming apparatus.

FIG. 1 is a perspective view of an image forming apparatus 1. In this application, a Z direction, an X direction, and a Y direction of an orthogonal coordinate system are defined as follows. The Z direction is the vertical direction and a +Z direction is the upward direction. The X direction and the Y direction are the horizontal direction. The X direction (a second direction) is the front-rear direction of the image forming apparatus 1. A +X direction is the forward direction. The Y direction (a first direction) is the left-right direction of the image forming apparatus 1. A +Y direction (a first side in the first direction) is a direction in which a sheet stored in a cassette 20 is supplied. A −Y direction (a second side in the first direction) is the opposite direction of the +Y direction.

The image forming apparatus 1 disposed in a workplace forms an image on a sheet. The image forming apparatus 1 is, for example, a multi function printer (MFP) or a copying machine. The image forming apparatus 1 may subject the image formed on the sheet to image processing. Examples of the image processing performed using the image forming apparatus 1 include processing for, for example, heating an image formed by decoloring toner to erase the image.

The image forming apparatus 1 includes a display 2, a control panel unit 3, an image reading unit 4, an image forming unit 5, and a sheet supply device 10.

The display 2 and the control panel unit 3 are used by a user to perform operation input for causing the image forming apparatus 1 to operate. The display 2 displays operation content performed by the user and a message to the user.

The image reading unit 4 reads a document and forms an image signal of an image to be formed by the image forming unit 5.

The image forming unit 5 forms an image on a sheet based on the operation input or a signal from the outside.

The sheet supply device (a paper feeding device) 10 is disposed in a lower part of the image forming apparatus 1. The sheet supply device 10 supplies a sheet to the image forming unit 5.

Figure 2:
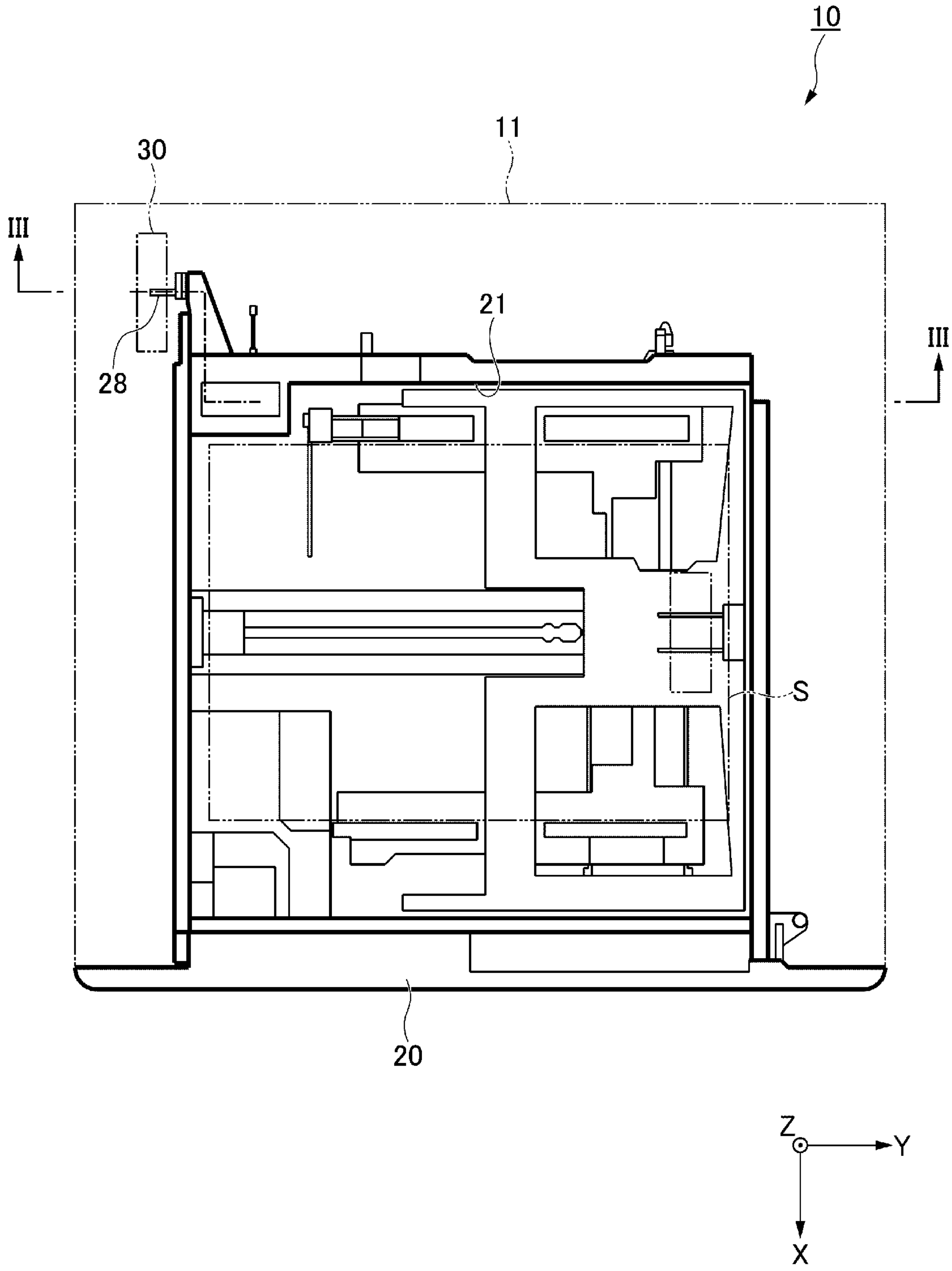
FIG. 2 is a plan view of a sheet supply device in an embodiment.

FIG. 2 is a plan view of the sheet supply device 10 in the embodiment. The sheet supply device 10 includes a cassette 20, a housing (a frame) 11, and a cassette drawing-in device 30.

The cassette 20 is formed in a box shape, the upper surface of which is opened. The cassette 20 includes a sheet storing unit 21 capable of storing sheets S. The sheets S are picked up one by one from the sheet storing unit 21 and supplied to the image forming unit 5. The sheet S is supplied in the +Y direction from the sheet storing unit 21.

Figure 3:
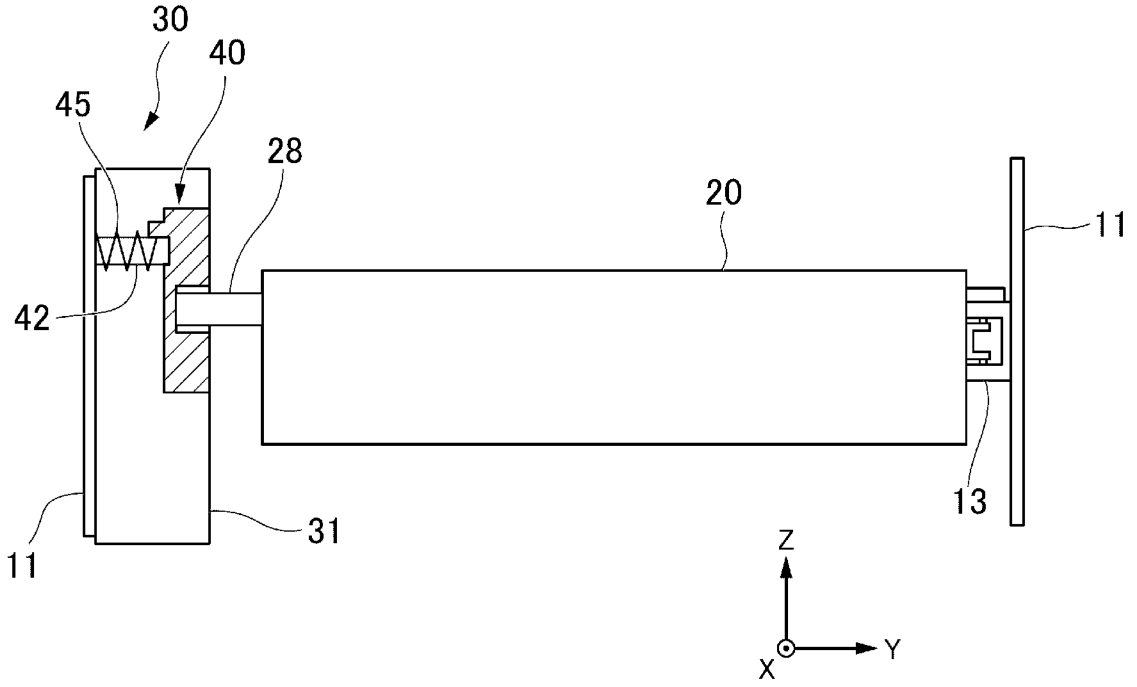
FIG. 3 is a sectional view taken along a III-III line in FIG. 2.

FIG. 3 is a sectional view taken along a III-III line in FIG. 2.

The housing 11 includes a slide rail 13. The slide rail 13 extends in the X direction. The slide rail 13 is disposed in the +Y direction of the cassette 20. The housing 11 is supports, via the slide rail 13, the cassette 20 to be movable in the X direction.

The cassette 20 moves in the +X direction to be drawn out from the housing 11. The cassette 20 moves in a −X direction to be housed in the housing 11. The user of the image forming apparatus 1 draws out the cassette 20 from the housing 11 and fills the sheets S in the cassette 20. The user houses the cassette 20 in the housing 11 and causes the image forming apparatus 1 to start image formation.

The cassette drawing-in device 30 draws the cassette 20 into the housing 11. As illustrated in FIG. 2, the cassette drawing-in device 30 is set in a corner of the −X direction and the −Y direction of the housing 11. The cassette 20 includes a cassette pin 28 in the corner of the −X direction and the −Y direction. The cassette pin 28 projects in the −Y direction from the cassette 20.

In housing the cassette 20, the user of the image forming apparatus 1 pushes in the cassette 20 in the −X direction. If the cassette 20 moves to near the end portion in the −X direction, the cassette pin 28 enters the cassette drawing-in device 30. The cassette drawing-in device 30 draws in the cassette pin 28 in the −X direction. The cassette 20 is housed in a predetermined position of the housing 11. The cassette drawing-in device 30 supports housing work for the cassette 20 by the user.

Figure 4:
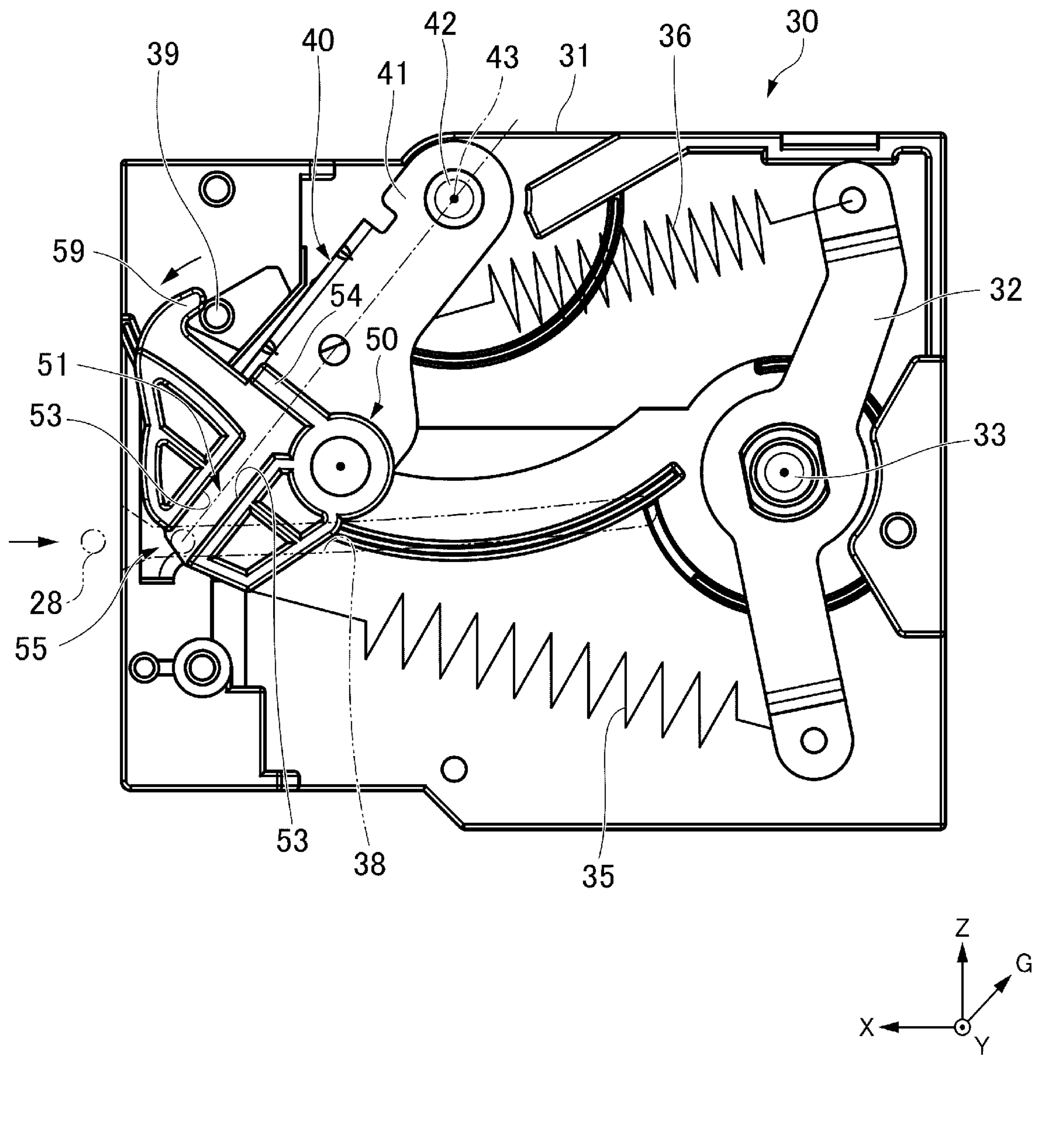
FIG. 4 is a side view of a cassette drawing-in device in the embodiment.

FIG. 4 is a side view of the cassette drawing-in device 30 in the embodiment. In FIG. 4, a state in which a side surface in the +Y direction of a cover 31 of the cassette drawing-in device 30 is removed is illustrated. The cassette drawing-in device 30 includes the cover 31, a first lever 32, a first spring 35, a second spring 36, and a second lever 40.

The cover 31 covers the cassette drawing-in device 30. The cover 31 is fixed to the housing 11 (see FIG. 3). A slit 38 is formed on the side surface in the +Y direction of the cover 31. The slit 38 extends in the −X direction from the end portion in the +X direction of the cover 31.

The first lever 32 is present at the end portion in the −X direction of the cassette drawing-in device 30. The first lever 32 extends in the Z direction. The first lever 32 is capable of turning around a first shaft 33 parallel to the Y direction. The first shaft 33 is present in the center in the Z direction of the first lever 32.

The first spring (an elastic member) 35 is present at the end portion in a −Z direction of the cassette drawing-in device 30. The first spring 35 extends in the X direction. The end portion in the +X direction of the first spring 35 is fixed to the cover 31. The end portion in the −X direction of the first spring 35 is connected to the end portion in the −Z direction of the first lever 32.

The second spring (an elastic member) 36 is present at the end portion in the +Z direction of the cassette drawing-in device 30. The second spring 36 extends in the X direction. The end portion in the −X direction of the second spring 36 is connected to the end portion in the +Z direction of the first lever 32. The end portion in the +X direction of the second spring 36 is connected to the second lever 40. The first spring 35 and the second spring 36 rotate the second lever 40.

The second lever (a lever) 40 includes a base lever 41, a second shaft 42, and an engaging member 50.

The base lever 41 is capable of turning around the second shaft 42. The second shaft 42 is present at the end portion in the +Z direction of the base lever 41. The second shaft 42 is fixed to the cover 31. The second shaft 42 has a columnar shape. A center axis (a rotation axis) 43 of the second shaft 42 is parallel to the Y direction. The second lever 40 including the base lever 41 is capable of rotating around the rotation axis 43 parallel to the Y direction.

The engaging member 50 is present at the end portion in the −Z direction of the base lever 41. The engaging member 50 includes an engaging hook 59 and an engaging groove 51.

In a state in which the cassette pin 28 does not engage in the engaging groove 51, the engaging hook 59 engages with a boss 39 fixed to the cover 31. The rotation of the second lever 40 is restricted by the engagement of the engaging hook 59 and the boss 39. The engaging hook 59 engages with the boss 39 in a state in which the first spring 35 and the second spring 36 are stretched.

The engaging groove 51 extends along the radial direction of the second shaft 42. In this application, a G direction is the longitudinal direction of the engaging groove 51 and a +G direction is the center side of the second shaft 42.

Figure 5:
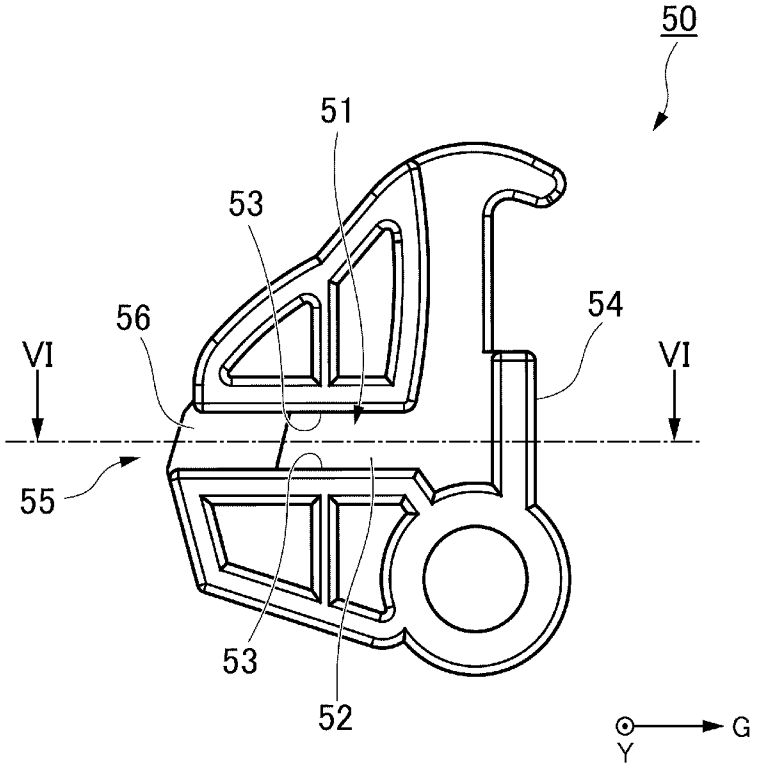
FIG. 5 is a side view of an engaging member.
Figure 6:
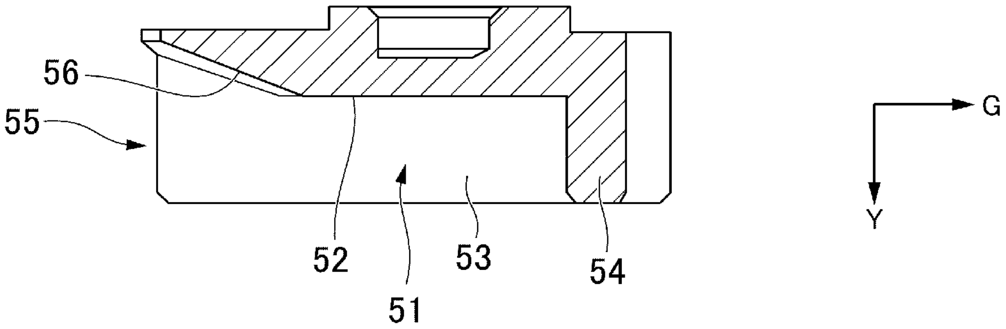
FIG. 6 is a sectional view taken along a VI-VI line in FIG. 5.

FIG. 5 is a side view of the engaging member. FIG. 6 is a sectional view taken along a VI-VI line in FIG. 5. The engaging groove 51 is opened in the +Y direction. The engaging groove 51 includes a bottom surface 52 in the −Y direction. The engaging groove 51 includes sidewalls 53 on both the sides in the width direction orthogonal to the G direction and the Y direction. The engaging groove 51 includes an end portion wall 54 at the end portion in the +G direction. The engaging groove 51 includes an entrance 55 for the cassette pin 28 at the end portion in a −G direction. The engaging groove 51 is capable of engaging with the cassette pin 28. As illustrated in FIG. 4, the second lever 40 including the engaging groove 51 rotates around the rotation axis 43 to thereby draw in, in the −X direction, the cassette pin 28 engaging in the engaging groove 51.

The rotation of the second lever 40 is restricted by the engagement of the engaging hook 59 and the boss 39. The cassette pin 28 moves in the −X direction and approaches the cassette drawing-in device 30. The cassette pin 28 enters the slit 38 of the cover 31. The cassette pin 28 enters the engaging groove 51 from the entrance 55 and engages in the engaging groove 51. The cassette pin 28 moves in the +G direction along the engaging groove 51. The cassette pin 28 moves in the −X direction along the slit 38 of the cover 31. The cassette pin 28 pushes the sidewalls 53 of the engaging groove 51 in the −X direction. The second lever 40 including the engaging groove 51 rotates around the second shaft 42. The engaging hook 59 and the boss 39 are disengaged. The first spring 35 and the second spring 36 shrink and the second lever 40 rotates. The second lever 40 rotates to draw in, in the −X direction, the cassette pin 28 engaging in the engaging groove 51.

As illustrated in FIGS. 5 and 6, the engaging member 50 includes a guide section 56. The guide section 56 is formed in the entrance 55 for the cassette pin 28 in the engaging groove 51. The guide section 56 guides the cassette pin 28 in the +Y direction. The guide section 56 is an inclined surface inclining in the +Y direction from the entrance 55 of the engaging groove 51 to the +G direction. The end portion in the +Y direction of the inclined surface of the guide section 56 and the bottom surface 52 of the engaging groove 51 excluding the guide section 56 are present in the same position in the Y direction. The bottom surface 52 of the engaging groove 51 is disposed to continue to the inclined surface of the guide section 56. The guide section 56 guides the cassette pin 28 to the bottom surface 52 of the engaging groove 51.

Figure 7:
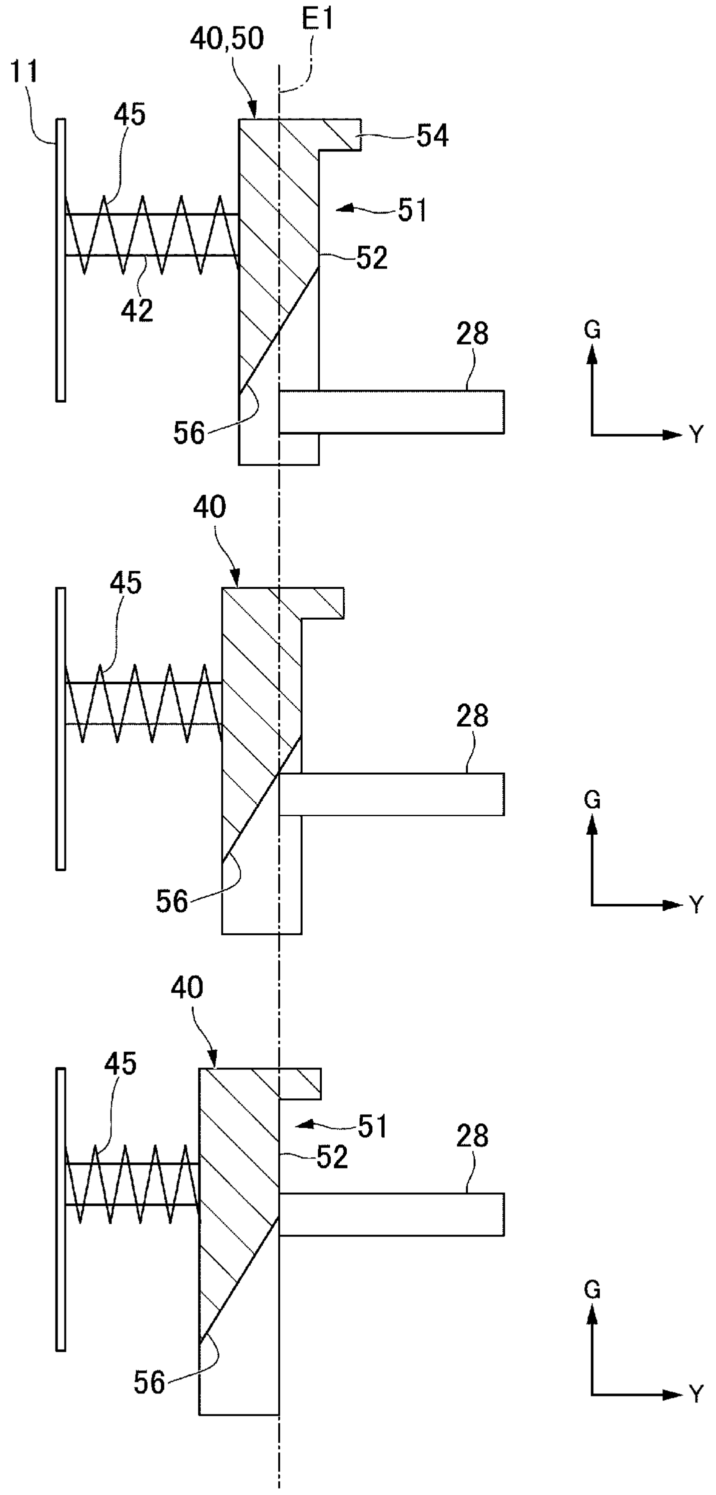
FIG. 7 is a first operation explanatory diagram of the sheet supply device.
Figure 8:
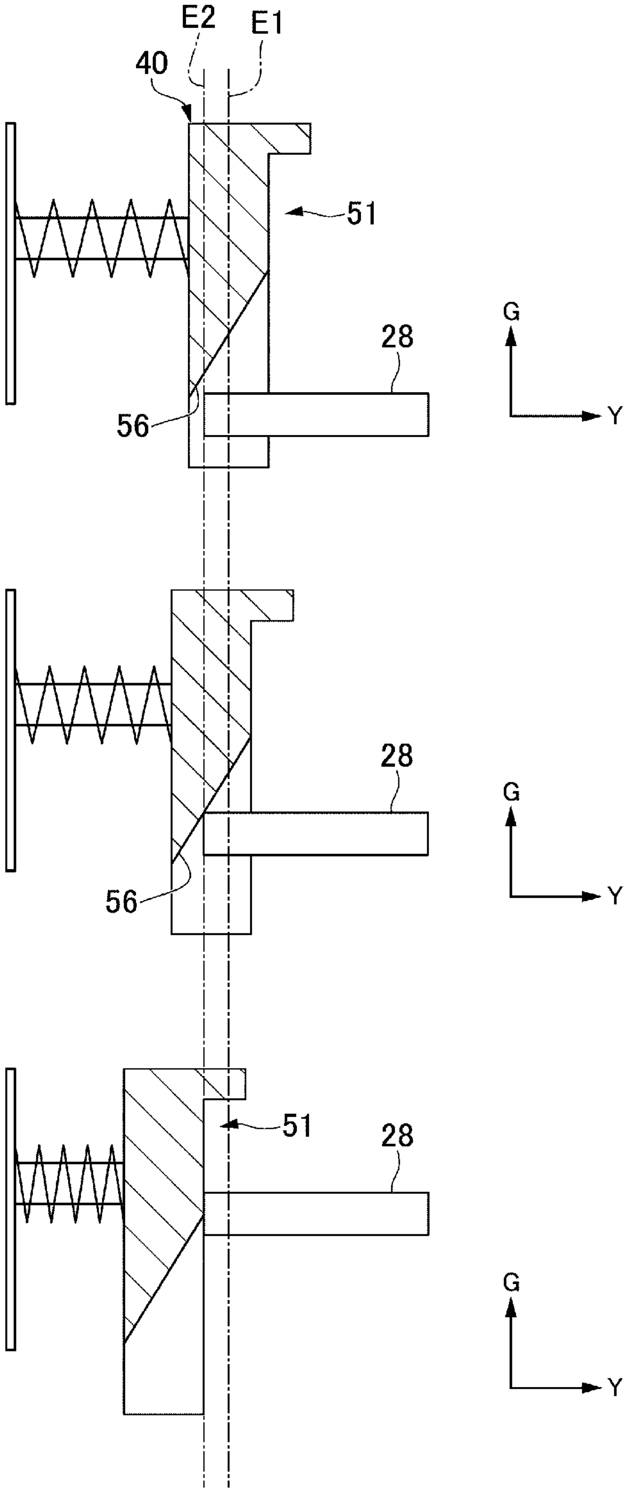
FIG. 8 is a second operation explanatory diagram of the sheet supply device.
Figure 9:
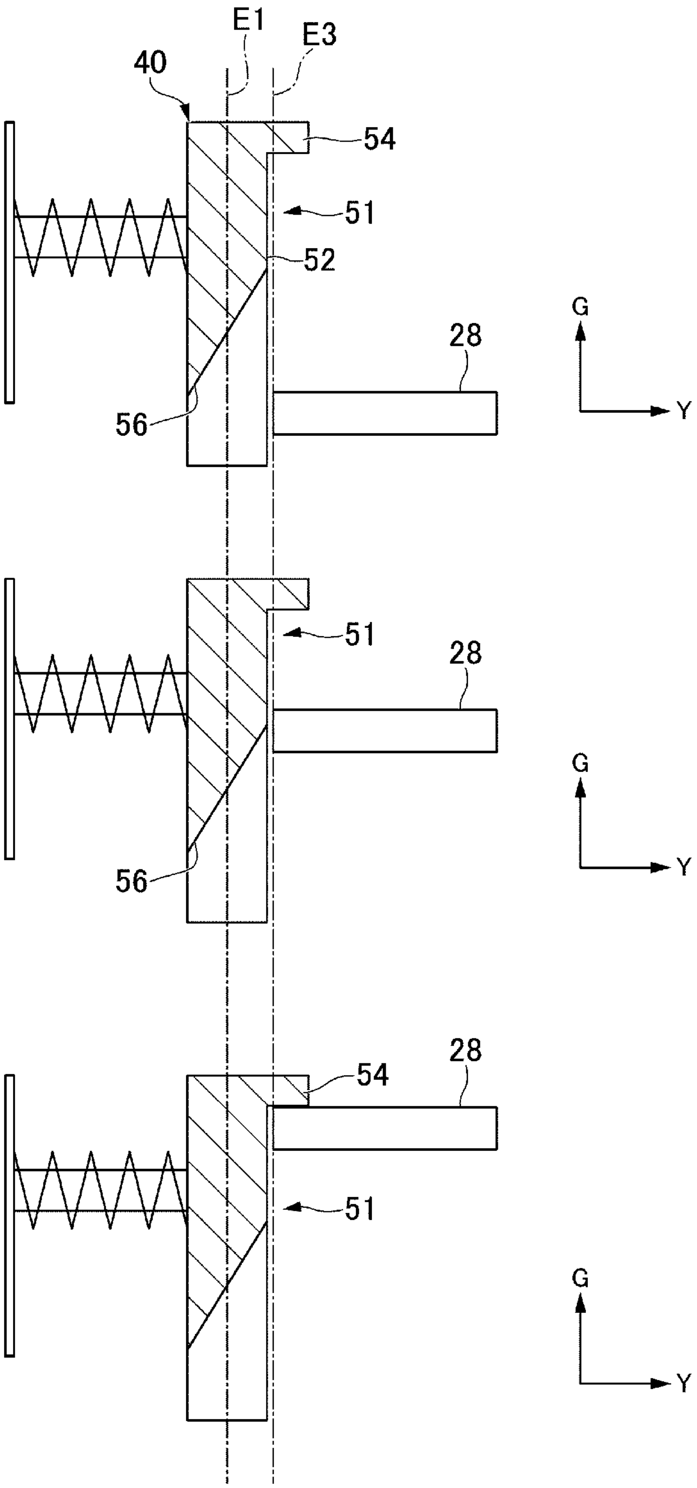
FIG. 9 is a third operation explanatory diagram of the sheet supply device.

FIG. 7 is a first operation explanatory diagram of the sheet supply device 10. FIG. 8 is a second operation explanatory diagram of the sheet supply device 10. FIG. 9 is a third operation explanatory diagram of the sheet supply device 10. In FIGS. 7 to 10, housing work for the cassette 20 progresses from an upper diagram to a lower diagram.

As illustrated in an upper diagram of FIG. 7, the second lever 40 is capable of moving in the Y direction along the second shaft 42. A stopper that defines a moving limit in the +Y direction of the second lever 40 is formed at the end portion in the +Y direction of the second shaft 42. The cassette drawing-in device 30 includes an urging member 45. The urging member 45 is disposed between the second lever 40 and the housing 11 (the cover 31) in a compressed state. The urging member 45 urges the second lever 40 in the +Y direction. The urging member 45 is disposed along the second shaft 42. For example, the urging member 45 is a coil spring. The coil spring is disposed coaxially with the second shaft 42.

The upper diagram of FIG. 7 illustrates a state before the cassette pin 28 engages in the engaging groove 51. In this state, the guide section 56 overlaps, in the Y direction, the distal end in the −Y direction of the cassette pin 28. The bottom surface 52 of the engaging groove 51 excluding the guide section 56 is present further in the +Y direction than the distal end of the cassette pin 28. A position and a shape of the second lever 40 are set to realize this state.

As illustrated in FIG. 3, the cassette 20 is supported by the housing 11 via the slide rail 13. In general, the slide rail 13 has a large backlash (play or gap) in the Y direction. The position of the distal end of the cassette pin 28 fluctuates in the Y direction. If the cassette pin 28 does not engage in the engaging groove 51, the cassette drawing-in device 30 does not operate. It is requested to improve reliability of the operation of the cassette drawing-in device 30.

In FIG. 7, the distal end in the −Y direction of the cassette pin 28 is present in a first position E1. The first position E1 is a position of the center in the Y direction in a fluctuation range in the Y direction of the distal end of the cassette pin 28. The upper diagram of FIG. 7 illustrates a state before the cassette pin 28 engages in the engaging groove 51. In this state, the center in the Y direction of the guide section 56 is present in the first position E1 where the distal end of the cassette pin 28 is located. A position and a shape of the second lever 40 are set to realize this state.

As illustrated in a center diagram of FIG. 7, the cassette pin 28 moves in the +G direction. The distal end of the cassette 28 comes into contact with the inclined surface of the guide section 56 and pushes the second lever 40 in the −Y direction. The second lever 40 moves in the −Y direction resisting an urging force of the urging member 45. The cassette pin 28 relatively moves in the +Y direction along the inclined surface of the guide section 56. The guide section 56 guides the cassette pin 28 in the +Y direction.

As illustrated in the lower diagram of FIG. 7, the cassette pin 28 further moves in the +G direction. The bottom surface 52 of the engaging groove 51 is disposed to continue to the inclined surface of the guide section 56. The cassette pin 28 relatively moved in the +Y direction along the inclined surface of the guide section 56 is guided to the inner side of the engaging groove 51 and engages in the engaging groove 51.

In FIG. 8, the distal end in the −Y direction of the cassette pin 28 is present in a second position E2. The second position E2 is a position at the end portion in the −Y direction in the fluctuation range in the Y direction of the distal end of the cassette pin 28. The second position E2 is present in the −Y direction of the first position E1. An upper diagram of FIG. 8 illustrates a state before the cassette pin 28 engages in the engaging groove 51. In this state, the vicinity of the end portion in the −Y direction of the guide section 56 is present in the second position E2 where the distal end of the cassette pin 28 is located. A position and a shape of the second lever 40 are set to realize this state.

The operation of the sheet supply device 10 performed if the distal end of the cassette pin 28 is present in the second position E2 is the same as the operation of the sheet supply device 10 performed if the distal end of the cassette pin 28 is present in the first position E1. As illustrated in a center diagram of FIG. 8, the cassette pin 28 relatively moves in the +Y direction along the inclined surface of the guide section 56. As illustrated in a lower diagram of FIG. 8, the cassette pin 28 is guided to the inner side of the engaging groove 51 and engages in the engaging groove 51.

In FIG. 9, the distal end in the −Y direction of the cassette pin 28 is present in a third position E3. The third position E3 is a position of the end portion in the +Y direction in the fluctuation range in the Y direction of the distal end of the cassette pin 28. The third position E3 is present in the +Y direction of the first position E1. An upper diagram of FIG. 9 illustrates a state before the cassette pin 28 engages in the engaging groove 51. In this state, the vicinity of the bottom surface 52 on the inner side of the engaging groove 51 is present in the third position E3 where the distal end of the cassette pin 28 is located. A position and a shape of the second lever 40 are set to realize this state.

As illustrated in a center diagram and a lower diagram of FIG. 9, the cassette pin 28 moves in the +G direction. The distal end of the cassette pin 28 enters the inner side of the engaging groove 51 without coming into contact with the guide section 56 and engages in the engaging groove 51.

In the upper diagram of FIG. 9, the vicinity of the end portion in the +Y direction of the guide section 56 may be present in the third position E3 where the distal end of the cassette pin 28 is located. The cassette pin 28 in this case relatively moves in the +Y direction along the inclined surface of the guide section 56. The cassette pin 28 is guided to the inner side of the engaging groove 51 and engages in the engaging groove 51.

As illustrated in FIGS. 7 to 9, the cassette pin 28 engages in the engaging groove 51 in the entire fluctuation range in the Y direction of the distal end of the cassette pin 28. The cassette drawing-in device 30 draws in the cassette 20. Reliability of the operation of the cassette drawing-in device 30 is improved.

As explained above in detail, the cassette drawing-in device 30 in the embodiment includes the second lever 40, the guide section 56, and the urging member 45. The second lever 40 is capable of rotating around the rotation axis 43 parallel to the Y direction. The second lever 40 includes the engaging groove 51 opened in the +Y direction. The engaging groove 51 includes the entrance 55 for the cassette pin 28 at the end portion in the G direction. The cassette pin 28 projects in the −Y direction, which is the opposite side of the +Y direction, from the cassette 20. The cassette 20 is capable of moving in the X direction orthogonal to the Y direction. The second lever 40 rotates around the rotation axis 43 to thereby draw in, in the X direction, the cassette pin 28 engaging in the engaging groove 51. The guide section 56 is formed in the entrance 55 of the engaging groove 51 and guides the cassette pin 28 in the +Y direction. The urging member 45 urges the second lever 40 in the +Y direction.

The guide section 56 is an inclined surface inclined in the +Y direction along the G direction from the entrance 55 of the engaging groove 51.

The end portion in the +Y direction of the inclined surface of the guide section 56 and the bottom surface 52 of the engaging groove 51 excluding the guide section 56 are present in the same position in the Y direction.

The cassette 20 moves in the X direction. The cassette pin 28 comes into contact with the guide section 56 of the second lever 40. The second lever 40 moves in the −Y direction resisting the urging force of the urging member 45. The cassette 20 continues the movement in the X direction without stopping the movement. The guide section 56 guides the cassette pin 28 to the engaging groove 51 in the +Y direction. Even if the position of the distal end of the cassette pin 28 fluctuates in the Y direction, the cassette pin 28 engages in the engaging groove 51.

Reliability of the operation of the cassette drawing-in device 30 is improved.

The urging member 45 is a coil spring.

The coil spring is inexpensive. Cost of the cassette drawing-in device 30 is reduced.

The urging member 45 is disposed along the rotation axis 43.

The urging member 45 operates along the rotation axis 43, whereby the operation of the urging member 45 stabilizes.

The cassette drawing-in device 30 further includes the cover 31 that houses the second lever 40. The second lever 40 includes the engaging hook 59 that restricts the rotation around the rotation axis 43. In a state in which the cassette pin 28 does not engage in the engaging groove 51, the engaging hook 59 engages with the boss 39 fixed to the cover 31.

The rotation of the second lever 40 is restricted in the state in which the cassette pin 28 does not engage in the engaging groove 51.

The cassette drawing-in device 30 further includes the first spring 35 and the second spring 36. In a state in which the engaging hook 59 is disengaged, the first spring 35 and the second spring 36 rotate the second lever 40 to draw in, in the X direction, the cassette pin 28 engaging in the engaging groove 51.

If the cassette pin 28 engages in the engaging groove 51, the engaging hook 59 and the boss 39 are disengaged. The second lever 40 rotates to draw in the cassette 20 in the X direction.

The sheet supply device 10 in the embodiment includes the cassette drawing-in device 30, the cassette 20, and the housing 11 explained above. The cassette drawing-in device 30 is disposed in the −Y direction of the cassette 20. The cassette 20 is capable of storing the sheets S. The housing 11 supports the cassette 20 to be movable in the X direction.

The sheet supply device 10 further includes the slide rail 13 disposed in the +Y direction of the cassette 20. The housing 11 supports, via the slide rail 13, the cassette 20 to be movable in the X direction.

In general, the slide rail 13 has a large backlash in the Y direction. The position of the distal end of the cassette pin 28 fluctuates in the Y direction. Even in this case, with the cassette drawing-in device 30 explained above, the cassette pin 28 engages in the engaging groove 51. The cassette drawing-in device 30 draws in the cassette 20. Reliability of the operation of the sheet supply device 10 is improved.

In a state in which the cassette pin 28 does not engage in the engaging groove 51, the guide section 56 overlaps, in the Y direction, the distal end in the −Y direction of the cassette pin 28.

Even if the position of the distal end of the cassette pin 28 fluctuates in the Y direction, the cassette pin 28 comes into contact with the guide section 56. The cassette pin 28 is guided to the engaging groove 51 by the guide section 56 and engages in the engaging groove 51. Reliability of the operation of the sheet supply device 10 is improved.

In the embodiment, the slide rail 13 is disposed in the +Y direction of the cassette 20. The cassette drawing-in device 30 is disposed in the −Y direction. In contrast, the slide rail 13 may be disposed in the −Y direction of the cassette 20. The cassette drawing-in device 30 may be disposed in the +Y direction. The constituent members of the sheet supply device 10 in this case have shapes obtained by mirror-inverting the constituent members of the sheet supply device 10 in the embodiment with respect to an XZ plane.

According to the at least one embodiment explained above, the cassette drawing-in device 30 includes the guide section 56 and the urging member 45. The guide section 56 is formed in the entrance 55 of the engaging groove 51 and guides the cassette pin 28 in the +Y direction. The urging member 45 urges the second lever 40 in the +Y direction. With this configuration, reliability of the operation of the cassette drawing-in device 30 and the sheet supply device 10 can be improved.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A cassette drawing-in device, comprising:

a lever configured to rotate around a rotation axis parallel to a first direction and including an engaging groove opened on a first side in the first direction, the engaging groove including an entrance for a cassette pin at an end portion in a longitudinal direction, the cassette pin projecting to a second side, which is an opposite side of the first side, in the first direction from a cassette, the cassette configured to move in a second direction orthogonal to the first direction, the lever rotating around the rotation axis to thereby draw in, in the second direction, the cassette pin engaging in the engaging groove;

a guide section formed in the entrance of the engaging groove and configured to guide the cassette pin to the first side in the first direction; and an urging member configured to urge the lever to the first side in the first direction.

2. The cassette drawing-in device according to claim 1, wherein the guide section is an inclined surface inclining from the entrance of the engaging groove to the first side in the first direction along the longitudinal direction.

3. The cassette drawing-in device according to claim 2, wherein an end portion on the first side in the first direction of the inclined surface of the guide section and a bottom surface of the engaging groove excluding the guide section are present in a same position in the first direction.

4. The cassette drawing-in device according to claim 1, wherein the urging member is a coil spring.

5. The cassette drawing-in device according to claim 1, wherein the urging member is disposed along the rotation axis.

6. The cassette drawing-in device according to claim 1, further comprising a cover configured to house the lever, wherein the lever includes an engaging hook configured to restrict rotation around the rotation axis, and in a state in which the cassette pin does not engage in the engaging groove, the engaging hook engages with a boss fixed to the cover.

7. The cassette drawing-in device according to claim 6, further comprising an elastic member configured to, in a state in which the engaging hook is disengaged, rotate the lever to draw in, in the second direction, the cassette pin engaging in the engaging groove.

8. An image forming apparatus comprising and image forming section and the cassette drawing-in device according to claim 1.

9. A sheet supply device, comprising:

a cassette drawing-in device disposed on a second side in a first direction of a cassette, the cassette drawing-in device comprising:

a lever configured to rotate around a rotation axis parallel to a first direction and including an engaging groove opened on a first side in the first direction, the engaging groove including an entrance for a cassette pin at an end portion in a longitudinal direction, the cassette pin projecting to a second side, which is an opposite side of the first side, in the first direction from the cassette, the cassette configured to move in a second direction orthogonal to the first direction, the lever rotating around the rotation axis to thereby draw in, in the second direction, the cassette pin engaging in the engaging groove, a guide section formed in the entrance of the engaging groove and configured to guide the cassette pin to the first side in the first direction, and an urging member configured to urge the lever to the first side in the first direction;

the cassette configured to store sheets; and a housing configured to support the cassette movable in the second direction.

10. The sheet supply device according to claim 9, further comprising a slide rail disposed on the first side in the first direction of the cassette, wherein the housing supports, via the slide rail, the cassette movable in the second direction.

11. The sheet supply device according to claim 9, wherein, in a state in which the cassette pin does not engage in the engaging groove, the guide section overlaps, in the first direction, a distal end on the second side in the first direction of the cassette pin.

12. An image forming apparatus comprising and image forming section and the sheet supply device according to claim 9.

13. A method, comprising:

rotating a lever of a cassette drawing-in device around a rotation axis parallel to a first direction, the lever including an engaging groove opened on a first side in the first direction, the engaging groove including an entrance for a cassette pin at an end portion in a longitudinal direction, the cassette pin projecting to a second side, which is an opposite side of the first side, in the first direction from a cassette;

moving the cassette in a second direction orthogonal to the first direction, the lever rotating around the rotation axis to thereby draw in, in the second direction, the cassette pin engaging in the engaging groove;

guiding the cassette pin to the first side in the first direction using a guide section formed in the entrance of the engaging groove; and urging the lever to the first side in the first direction.

14. The method according to claim 13, wherein the guide section is an inclined surface inclining from the entrance of the engaging groove to the first side in the first direction along the longitudinal direction.

15. The method according to claim 14, wherein an end portion on the first side in the first direction of the inclined surface of the guide section and a bottom surface of the engaging groove excluding the guide section are present in a same position in the first direction.

16. The method according to claim 13, wherein the urging member is a coil spring.

17. The method according to claim 13, wherein the urging member is disposed along the rotation axis.

18. The method according to claim 13, further comprising:

housing the lever in a cover, restricting rotation around the rotation axis with an engaging hook, and in a state in which the cassette pin does not engage in the engaging groove, engaging the engaging hook with a boss fixed to the cover.

19. The method according to claim 18, further comprising:

in a state in which the engaging hook is disengaged, rotating the lever with an elastic member to draw in, in the second direction, the cassette pin engaging in the engaging groove.

* * * * *